(12) United States Patent
Karlinger

(10) Patent No.: US 6,684,731 B1
(45) Date of Patent: Feb. 3, 2004

(54) HOLDING ARM FOR ENERGY SUPPLY

(75) Inventor: Stefan Karlinger, Augsburg (DE)

(73) Assignee: Kuka Roboter GmbH, Augsburg (DE)

(*) Notice: Subject to any disclaimer, the term of this patent is extended or adjusted under 35 U.S.C. 154(b) by 0 days.

(21) Appl. No.: 09/573,716

(22) Filed: May 12, 2000

(30) Foreign Application Priority Data

May 15, 1999 (DE) ..................... 299 08 623 U

(51) Int. Cl.[7] ................ B25J 9/00; F16L 3/00
(52) U.S. Cl. ............ 74/490.02; 248/51; 248/58; 901/15; 901/23; 901/38; 901/50
(58) Field of Search ............ 74/490.02, 473.14, 74/473.15; 248/49, 51, 123.1, 542, 58; 901/15, 50, 23, 24, 38

(56) References Cited

U.S. PATENT DOCUMENTS

| | | | | |
|---|---|---|---|---|
| 4,364,535 A | * | 12/1982 | Itoh et al. ........... | 248/123.1 |
| 4,507,042 A | * | 3/1985 | Suzuki et al. ........ | 414/680 |
| 4,563,567 A | * | 1/1986 | Geffroy et al. ....... | 901/15 X |
| 4,625,936 A | * | 12/1986 | Hadden, Sr. ......... | 248/51 X |
| 4,676,472 A | * | 6/1987 | Kamrud, Sr. ......... | 248/542 |
| 4,705,243 A | * | 11/1987 | Hartmann et al. ..... | 901/15 X |
| 4,767,257 A | * | 8/1988 | Kato ................. | 901/15 X |
| 4,969,795 A | * | 11/1990 | Toyada et al. ....... | 901/50 X |
| 5,115,690 A | * | 5/1992 | Torii et al. ......... | 74/479 |
| 5,132,601 A | * | 7/1992 | Ohtani ............... | 901/42 X |
| 5,651,519 A | * | 7/1997 | Goodrich et al. ..... | 248/51 |
| 5,694,813 A | * | 12/1997 | McLaughlan .......... | 74/490.02 |
| 5,740,994 A | * | 4/1998 | Laughlin ............ | 248/58 X |
| 5,813,286 A | * | 9/1998 | Hansen .............. | 74/490.02 |
| 5,893,490 A | * | 4/1999 | Gnyp ................. | 414/918 X |
| 5,893,539 A | * | 4/1999 | Tran et al. ......... | 248/68.1 |
| 6,186,458 B1 | * | 2/2001 | Hansen .............. | 248/274.1 |

* cited by examiner

Primary Examiner—David A. Bucci
Assistant Examiner—Colby Hansen
(74) Attorney, Agent, or Firm—McGlew and Tuttle, P.C.

(57) ABSTRACT

A robot with at least partly externally located cables, particularly robot tool supply cables having a length reserve in the area of the A3 axis of the robot is characterized by a base part located on the robot and having elements for guiding the supply cables and with a leg pivotable against the latter on which is located at least one of the elements for supply cable guidance.

17 Claims, 3 Drawing Sheets

HOLDING ARM FOR ENERGY SUPPLY

FIELD OF THE INVENTION

The invention relates to a robot with an at least partly externally located cable, particularly robot tool supply cables guided in a conduit and having a length reserve, particularly in the vicinity of the A3 axis of the robot.

BACKGROUND OF THE INVENTION

The resulting distance changes between individual points of the robot must be taken into consideration particularly when guiding the supply cables, e.g. of robot tools.

In order to be able to carry out such distance changes without stressing the supply cables, the latter must have a length reserve. With externally guided supply cables the problem arises that in the robot arm working positions where the length reserve is not used, the supply cables can give rise to a relatively large interfering contour and as a result of the length reserve a bending or kinking of the supply cables can occur on stressing.

Therefore the problem of the invention is to so further develop a robot of the aforementioned type that with very simple components, the interfering contour caused by the supply cables can be kept as small as possible and that despite the supply cable length reserve a bending thereof is avoided.

SUMMARY OF THE INVENTION

According to the invention the set problem is solved in the case of a robot of the aforementioned type by a base part located on the robot and having elements for guiding the supply cables and with a leg pivotable against the latter, on which is located at least one of the elements for supply cable guidance. Through the base part passing through the supply cables in the area of their length reserve, the supply cables are closely guided on the outside of the robot parts, which leads to a reduce interfering contour and as a result of the increase guidance there is also a smaller supply cable bending risk. Through the arrangement of the supply cables on the base part, there is also a significant reduction to the sideways movement of said supply cables.

As a result of the leg pivotable against the base part and the provision of elements for guiding the cable both on the leg and on the base part, the cable guide can follow the stressed cable, so that the angles which arise between the guide elements significantly reduce the bending risk.

According to a preferred embodiment the base part has stops, which limit the pivotability of the leg in both pivoting directions and with which it is possible to ensure that the supply cables can only be displaced in a certain, limited range. The leg or arm is fundamentally freely movable in the limited area. Its position is determined by the conduit held by it and by its elasticity.

The leg can additionally be connected by a spring element to the base part, which keeps the leg in a given position in the unstressed state and from which it can only be moved by a stress acting counter to the spring tension.

According to an advantageous development on the base part is provided a ledge for fixing the individual supply cables, so that they are secured in the starting area of the length reserve and consequently there is no influencing of the cable guide in the section upstream of the length reserve.

Advantageously said ledge has individual bores in which are individually guided that supply cables and which can consequently also be individually fixed, so that mutual influencing of the supply cables is substantially avoided.

The supply cables are preferably movably guided on the guide on the leg of the base part. Thus, the supply cables remain mobile along the path predetermined by the guide elements and can follow the robot arm movements.

In a particularly favourable variant the supply cables are guided in a conduit, which prevents damage or twisting of the supply cables, the conduit being fixed to the base part and movably guided on the leg.

Advantageously the base part has further devices for fitting guide elements for the supply cables, with which it is possible in an optimum manner to guide to the robot parts excess lengths, i.e. with a minimum interfering contour.

According to a preferred embodiment the base part has a fixing element for connection to the robot arm, the letter being advantageously located on the motor screws of the A3 axis or shaft. The arrangement of the fixing element in the immediate area of the rotation axis of the robot arm, in the case of movements of the latter leads to a relative movement between the supply cable and the base part which, in proportion to the rotary movements of the robot are about the A3 axis of the robot ensures the bend-free guidance of the supply cable.

In a particularly simple and inexpensive construction the fixing element is a flange.

BRIEF DESCRIPTION OF THE DRAWINGS

Further advantages and features of the invention can be gathered from the claims and the following description of an embodiment of an inventively constructed robot shown in the attached drawings, wherein represent:

DETAILED DESCRIPTION OF THE DRAWINGS

Figure 1:
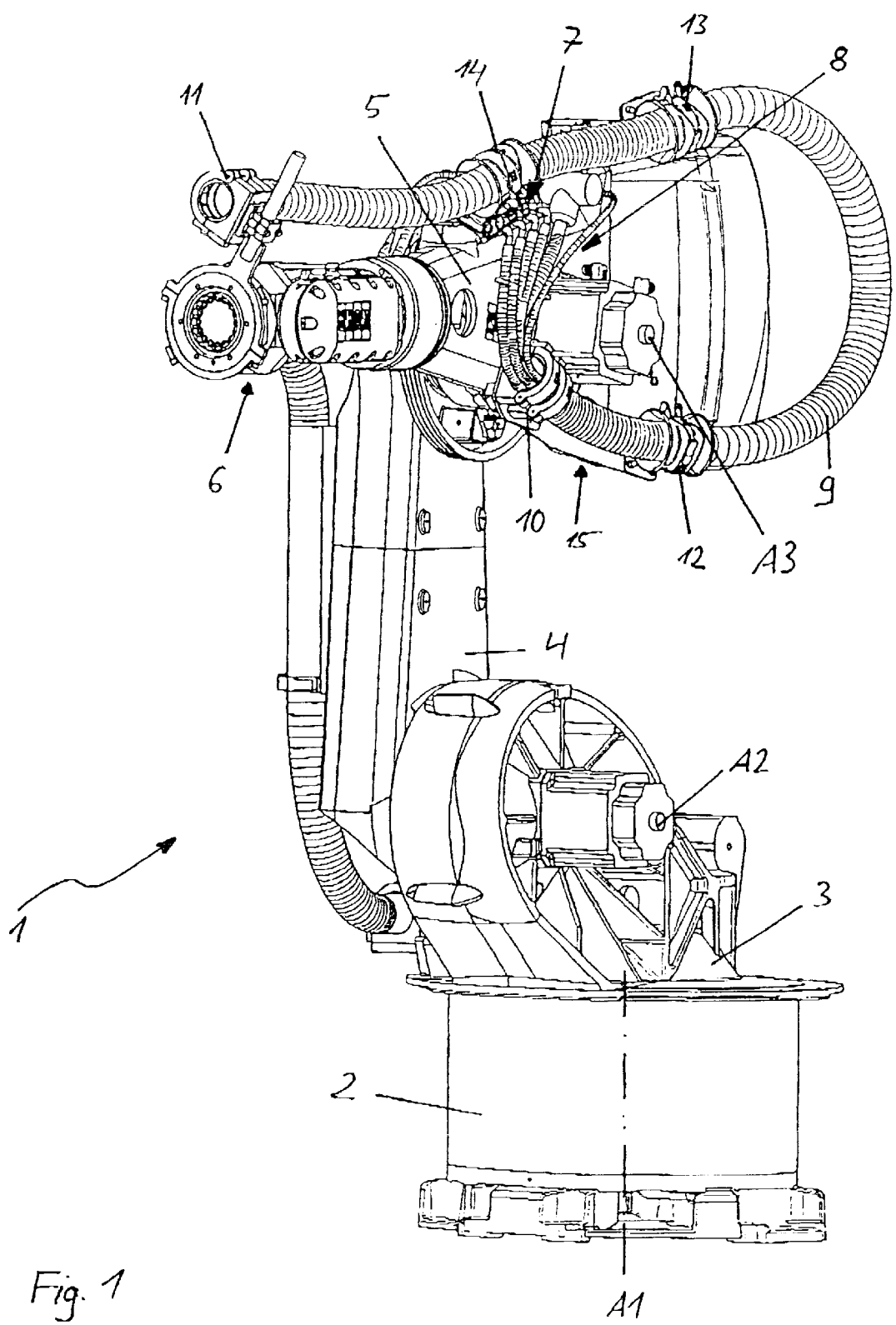
FIG. 1 An industrial robot in a perspective view.

The industrial robot 1 constructed in accordance with the invention shown in FIG. 1 has a pedestal 2 with a turret 3 pivotable about the vertical A1 axis and placed thereon. A first robot arm 4 is placed on the turret 3 so as to be pivotable about the A2 axis. A second robot arm 5, which carries the robot hand 6 for receiving the machining tools, etc. is placed on the robot arm 4 so as to pivot about the horizontal A3 axis. On the outside of the guide arm 4 cables are guided to a cable separation point 7 located on the robot arm 5. From the cable separation point 7 supply cables 8 lead to a not shown tool located on the robot hand 6. The supply cables 7 are guided in a conduit 9, the latter and consequently also the supply cables 7 passing in an initially downwardly directed, substantially circular loop, which is then guided substantially parallel to the robot arm 5/robot hand 6. The start of the conduit 9 is fixed by a cable clamp 10 to the robot arm 5 and its end is fixed by a clamp 11 to the robot hand 6. Between the two fixed clamps 10 and 11 the conduit 9 is guided in floating manner on clamps 12, 13 and 14. In vicinity of the A3 robot axis the clamps 10 and 11 are jointly placed on a base part 15 in the form of a base plate.

Figure 2:
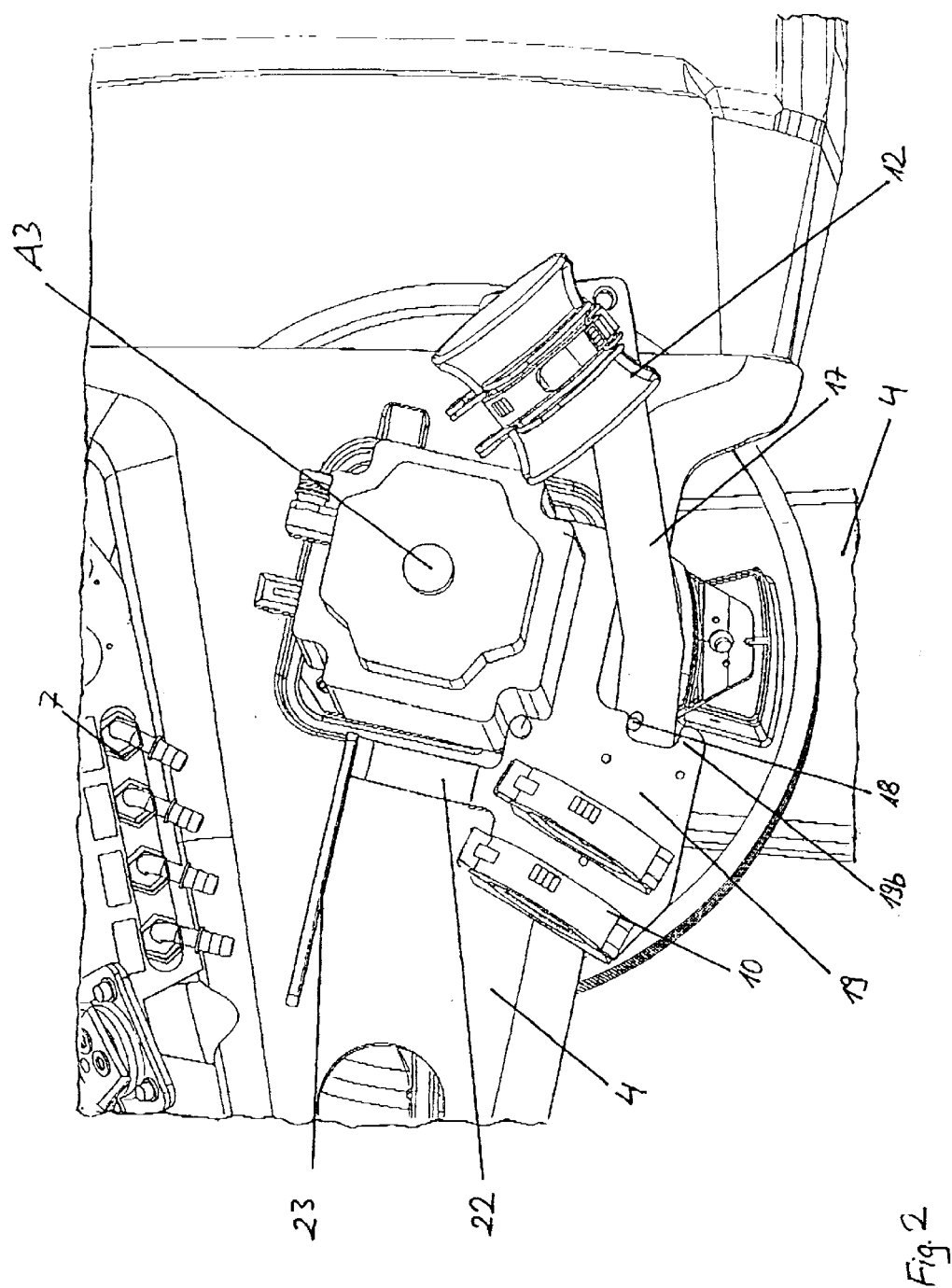
FIG. 2 A detail of the industrial robot in the vicinity of the A3 axis in plan view.
Figure 3:
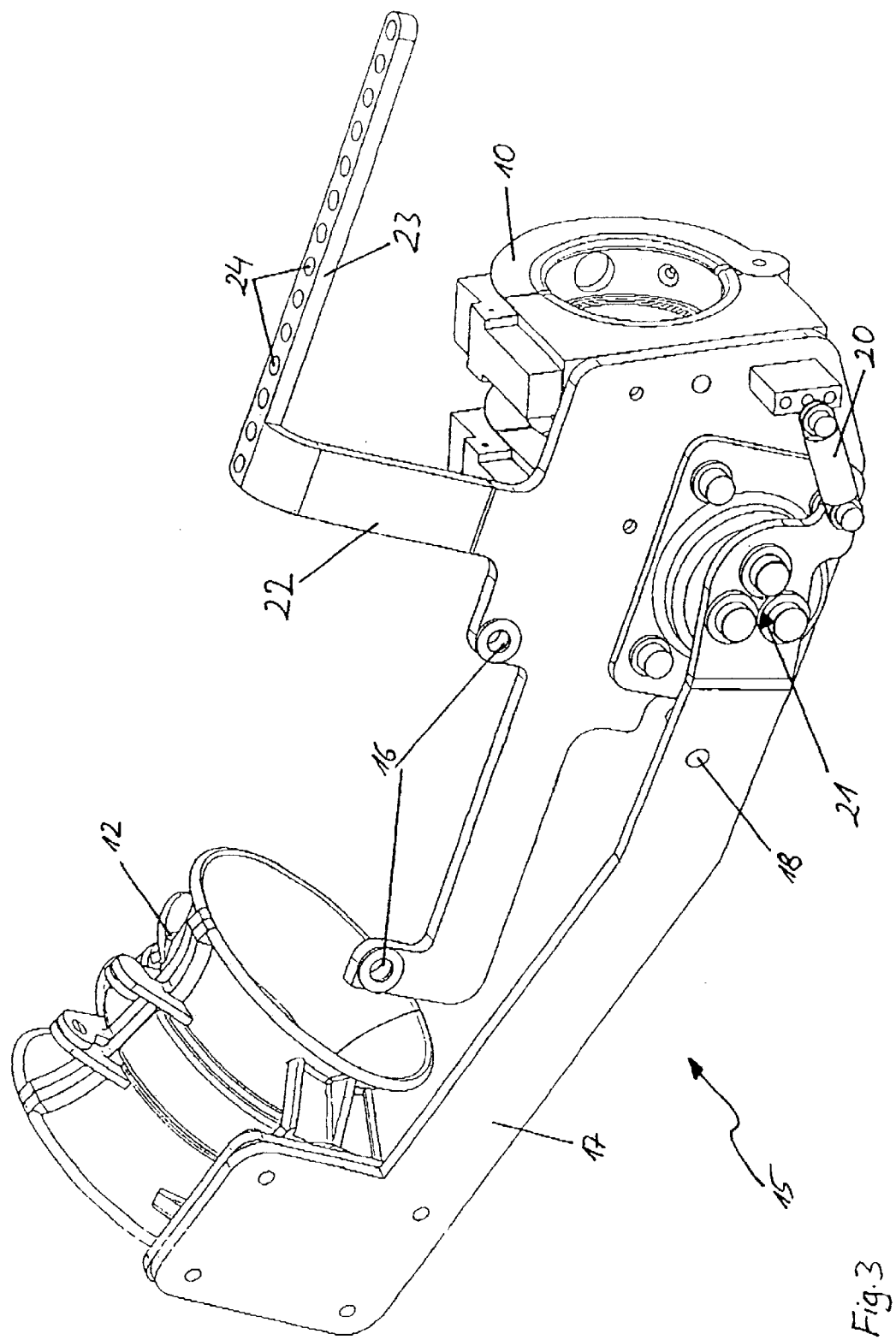
FIG. 3 A base part according to the invention in a perspective view.

FIG. 2 shows a detail of the robot 1 of FIG. 1 in the vicinity of the A3 axis, about which the robot arm 5 is pivotably placed on the robot arm 4. FIG. 2 only shows the connections of the cable separation point 7, but not the supply cables 8 and conduit 9 shown in FIG. 1. In the area of the A3 axis is located the base part 15, which has corresponding bores 16, in order to be fixed together with the motor to the robot arm 5. The base part 15 has a leg 17 movable against the base part. The leg 17 is pivotably placed on the base part 15 and the pivotability is limited by a pin 18 of leg 17 guided in a recess with stops of the base part 15. On the base part 15 is located the fixed double clamp 10 and on the leg 17 the floating clamp 12 pivotable with respect to the latter. As shown in FIG. 3 the leg 17 is held in a preferred position on the base part 15 by a substantially relieved tension spring 20, but this need not be provided and from it the leg 17 with the clamp 12 can only be pivoted about the axis 21 counter to the tension of the spring 20. The spring 20 located between the base part 15 and the leg 17 draws the latter into the position in which the pin 18 of the leg comes into contact with the stop 19b (FIG. 2) of the base part 15. On shortening the length of the supply cable or conduit the leg 17 can be pivoted counter to the tension of the spring 20, so that the guide clamp 12 with the leg 17 follows the movement of the cable in order to prevent bending of the latter.

As can also be seen in FIG. 3, the base part 15 has a ledge 23 with bores 24 offset by means of a plate 22 from the base plate 19 for receiving and guiding supply cables in the area between the cable separation point 7 and the start of the conduit 9 in the area of the cable clamp 10.

LIST OF REFERENCE NUMERALS

1 Robot
2 Pedestal
3 Turret
4/5 Robot arm
6 Robot hand
7 Cable separation point
8 Supply cable
9 Conduit
10 Cable clamp
11/12/13/14 Clamp
15 Base part
16 Bores
17 Leg
18 Pin
19b Stop
20 Tension spring
21 Pivot axis
22 Ledge
23 Bores
A1 Vertical axis
A2 Axis
A3 Horizontal axis

What is claimed is:
1. A robot comprising:
a first robot arm;
a second robot arm pivotally connected to said first robot arm about a robot axis;
a supply cable arranged externally on one of said robot arms with a length reserve in an area of said robot axis;
a cable holder base part mounted on said one of said robot arms, said cable holder base part including a first guide element guidable of said supply cable;
a cable holder leg pivotally connected to said cable holder base part about an axis substantially parallel to said robot axis, said cable holder leg including a second guide element guidable of said supply cable, said base part having stops for limiting pivotability of the leg;
a tension spring element connected to said cable holder base part and to said cable holder leg, said tension spring element biasing said cable holder leg against one of said stops with respect to said cable holder base part.

2. Robot according to claim 1, wherein said tension spring element is located between the leg and the base part.

3. Robot according to claim 1, wherein a plurality of supply cables are provided, the base part having a ledge for fixing the individual supply cables.

4. Robot according to claim 3, wherein the ledge has individual bores.

5. Robot according to claim 1, wherein a plurality of supply cables are provided, the supply cables are movably guided on one of said guide elements.

6. Robot according to claim 1, wherein a plurality of supply cables are provided, a conduit is attached essentially to the second robot arm for receiving the supply cables.

7. Robot according to claim 1, wherein the base part has a fixing element for connection to one of the robot arms.

8. Robot according to claim 7, wherein the fixing element is mounted by means of motor screws of the robot axis pivotably connecting the second robot arm with the first robot arm.

9. Robot according to claim 7, wherein the fixing element is flange.

10. A robot in accordance with claim 1, wherein:
said leg is pivotal through a range to hold said supply cable at said different cable lengths without kinking said supply cable;
both said first and second guide elements jointly guide said supply cable;
one of said guide elements include a cable clamp.

11. A robot in accordance with claim 1, wherein:
said supply cable is movably connected to at least one of said guide elements.

12. A robot in accordance with claim 1, further comprising:
a plurality of said supply cables;
a conduit receiving said supply cables;
an end of said conduit being connected to said first guide element;
said second guide element being connected to said conduit and spaced from said end of said conduit.

13. A robot in accordance with claim 1, wherein:
said cable holder base part is mounted on said second robot arm;
a third robot arm is movably connected to said second robot arm, said supply cable is connected to said third robot arm, said length reserve compensates for different cable lengths needed for different relative positions of said second robot arm with respect to said third robot arm.

14. A robot in accordance with claim 13, wherein:
said second guide element guides said length reserve of said supply cable.

15. A robot in accordance with claim 13, wherein:
additional guide elements are connected to said second robot arm, said additional guide elements and said second guide element guide said supply cable in a floating manner.

16. A robot in accordance with claim 15, wherein:
said first guide element fixes said supply cable to said second robot arm;
said supply cable is fixed to said third robot arm.

17. A robot comprising:
a first elongated robot arm;

a second elongated robot arm provided with a robot hand, the second robot arm being pivotally connected to said first robot arm about a horizontal robot axis;

a supply cable arranged externally on at least one of said robot arms with a length reserve in an area of said robot axis;

a cable holder having a base part and a leg, said base part being mounted on said one of said robot arms, said cable holder base part including a first guide element guidable of said supply cable, said base part having stops for limiting pivotability of the leg;

said cable holder leg being pivotally connected to said cable holder base part about an axis substantially parallel to said horizontal robot axis, said cable holder leg including a second guide element guidable of said same supply cable;

a tension spring element connected to said cable holder base part and to said cable holder leg, said tension spring element biasing said cable holder leg against one of said stops with respect to said cable holder base part.

* * * * *